(12) United States Patent
Takeshita

(10) Patent No.: US 12,530,157 B2
(45) Date of Patent: Jan. 20, 2026

(54) INFORMATION PROCESSING APPARATUS, NON-TRANSITORY COMPUTER READABLE MEDIUM, AND INFORMATION PROCESSING METHOD

(71) Applicant: FUJIFILM Business Innovation Corp., Tokyo (JP)

(72) Inventor: Yoshihiro Takeshita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 330 days.

(21) Appl. No.: 18/182,606

(22) Filed: Mar. 13, 2023

(65) Prior Publication Data

US 2024/0069828 A1 Feb. 29, 2024

(30) Foreign Application Priority Data

Aug. 25, 2022 (JP) ................. 2022-134002

(51) Int. Cl.
*G06F 3/12* (2006.01)
(52) U.S. Cl.
CPC .......... *G06F 3/1238* (2013.01); *G06F 3/1222* (2013.01); *G06F 3/1255* (2013.01)
(58) Field of Classification Search
None
See application file for complete search history.

(56) References Cited

U.S. PATENT DOCUMENTS

| 8,947,706 | B2 | 2/2015 | Ichida | |
|---|---|---|---|---|
| 2010/0309510 | A1* | 12/2010 | Hansen | G06F 3/1288 358/1.15 |
| 2011/0063674 | A1* | 3/2011 | Tabata | H04N 1/00244 358/1.15 |
| 2013/0222827 | A1* | 8/2013 | Watanabe | G06F 3/122 358/1.14 |
| 2013/0242334 | A1* | 9/2013 | Ichida | G06F 21/608 358/1.14 |
| 2023/0070478 | A1* | 3/2023 | Okamoto | G06F 3/1238 |

FOREIGN PATENT DOCUMENTS

JP  5212559 B1  6/2013

\* cited by examiner

*Primary Examiner* — Haris Sabah
(74) *Attorney, Agent, or Firm* — Oliff PLC

(57) ABSTRACT

An information processing apparatus includes a processor configured to: after determining that a predetermined condition applied to increasing information security is satisfied, acquire print information that is registered on an office virtual image forming apparatus that is a virtual apparatus of an image forming apparatus installed in an office; and register the acquired print information on a personal virtual image forming apparatus that is a virtual apparatus of a personal image forming apparatus.

8 Claims, 13 Drawing Sheets

FIG. 6

| OFFICE ID | OFFICE VIRTUAL IMAGE FORMING APPARATUS | IDENTIFICATION INFORMATION | PERSONAL VIRTUAL IMAGE FORMING APPARATUS |
|---|---|---|---|
| C001 | (OFFICE VIRTUAL IMAGE FORMING APPARATUS A1) | H12345 | (PERSONAL VIRTUAL IMAGE FORMING APPARATUS B1) |
| C002 | | H12346 | (PERSONAL VIRTUAL IMAGE FORMING APPARATUS B2) |
| ... | ... | ... | ... |

| OFFICE ID | SENDER | DESTINATION | DATE AND TIME | PRINT INFORMATION |
|---|---|---|---|---|
| C001 | P12345 | H12345 | 7/29/2022 10:18 | (PRINT INFORMATION P1) |
| | | | 7/29/2022 10:24 | (PRINT INFORMATION P2) |
| C002 | ... | ... | ... | ... |
| ... | ... | ... | ... | ... |

ENTER IDENTIFICATION INFORMATION (SERIAL NUMBER) OF
HOME PRINTER AND ID NUMBER OF OFFICE.

IDENTIFICATION
INFORMATION    | H12345 |  35A

OFFICE ID      | C001   |  35B

35D
RUN

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2022-134002 filed Aug. 25, 2022.

BACKGROUND

(i) Technical Field

The present disclosure relates to an information processing apparatus, a non-transitory computer readable medium, and an information processing method.

(ii) Related Art

Technology related to a virtual image forming apparatus corresponding to an image forming apparatus is available as described below.

Japanese Patent No. 5212559 discloses the image forming apparatus. The image forming apparatus connected to an information system performing first authentication in an organization, such as a company, acquires print data from a print service system installed in a cloud service performing second authentication different from the first authentication and prints the print data. The image forming apparatus manages a process related to the printing by using user identification information in the first authentication.

The image forming apparatus includes an acquisition unit and a control unit. A logical printer (corresponding to a virtual image forming apparatus) in a second system performing the second authentication is loaded with information on the image processing apparatus serving as a destination and is also loaded with setting information including first information serving as identification information on a user of a first system that performs the first authentication and is connected to the image processing apparatus. The acquisition unit acquires print data including the first information created by the logical printer. The control unit performs control to perform a print operation by using the first information included in the setting information set in the acquired print data.

With the growth of remote work, there is an increasing demand that a document created in an office in remote work is printed on a personal image forming apparatus at home that may not provide security as high as that in the office.

It may be contemplated that the document produced in the office is printed using the virtual image forming apparatus disclosed in Japanese Patent No. 5212559.

According to the disclosed technique, however, if the personal image forming apparatus performs the print operation by directly acquiring print information from the virtual image forming apparatus, it may be difficult to assure security about the print information.

SUMMARY

Aspects of non-limiting embodiments of the present disclosure relate to providing an information processing apparatus, a non-transitory computer readable medium, and an information processing method allowing a personal image forming apparatus in an insecure environment to more safely print a document created in a secure environment than when print information registered on a virtual image forming apparatus is directly used.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: after determining that a predetermined condition applied to increasing information security is satisfied, acquire print information that is registered on an office virtual image forming apparatus that is a virtual apparatus of an image forming apparatus installed in an office; and register the acquired print information on a personal virtual image forming apparatus that is a virtual apparatus of a personal image forming apparatus.

BRIEF DESCRIPTION OF THE DRAWINGS

Exemplary embodiment of the present disclosure will be described in detail based on the following figures, wherein:

FIG. 6 illustrates a structure example of a virtual image forming apparatus information database of the exemplary embodiment of the disclosure;

FIG. 7 illustrates a structure example of a log information database of the exemplary embodiment of the disclosure;

FIG. 9 is a front view example of a registration information input screen of the exemplary embodiment of the disclosure;

DETAILED DESCRIPTION

Exemplary embodiment of the disclosure is described with reference to the drawings. According to the exemplary embodiment, an information processing apparatus of the exemplary embodiment uses a cloud server and is applied to an information processing system that provides a cloud print service by using as a virtual printer an image forming apparatus installed in an office or at home. In the cloud print service, a user outside an office may use a terminal apparatus not connectable to a network linked to the image forming apparatus in order to cause the image forming apparatus to perform a print operation. The information processing apparatus of the exemplary embodiment of the disclosure is applied not only to the cloud print service but also a system that uses as a virtual apparatus an apparatus used in a variety of services other than the print cloud service.

Figure 1:
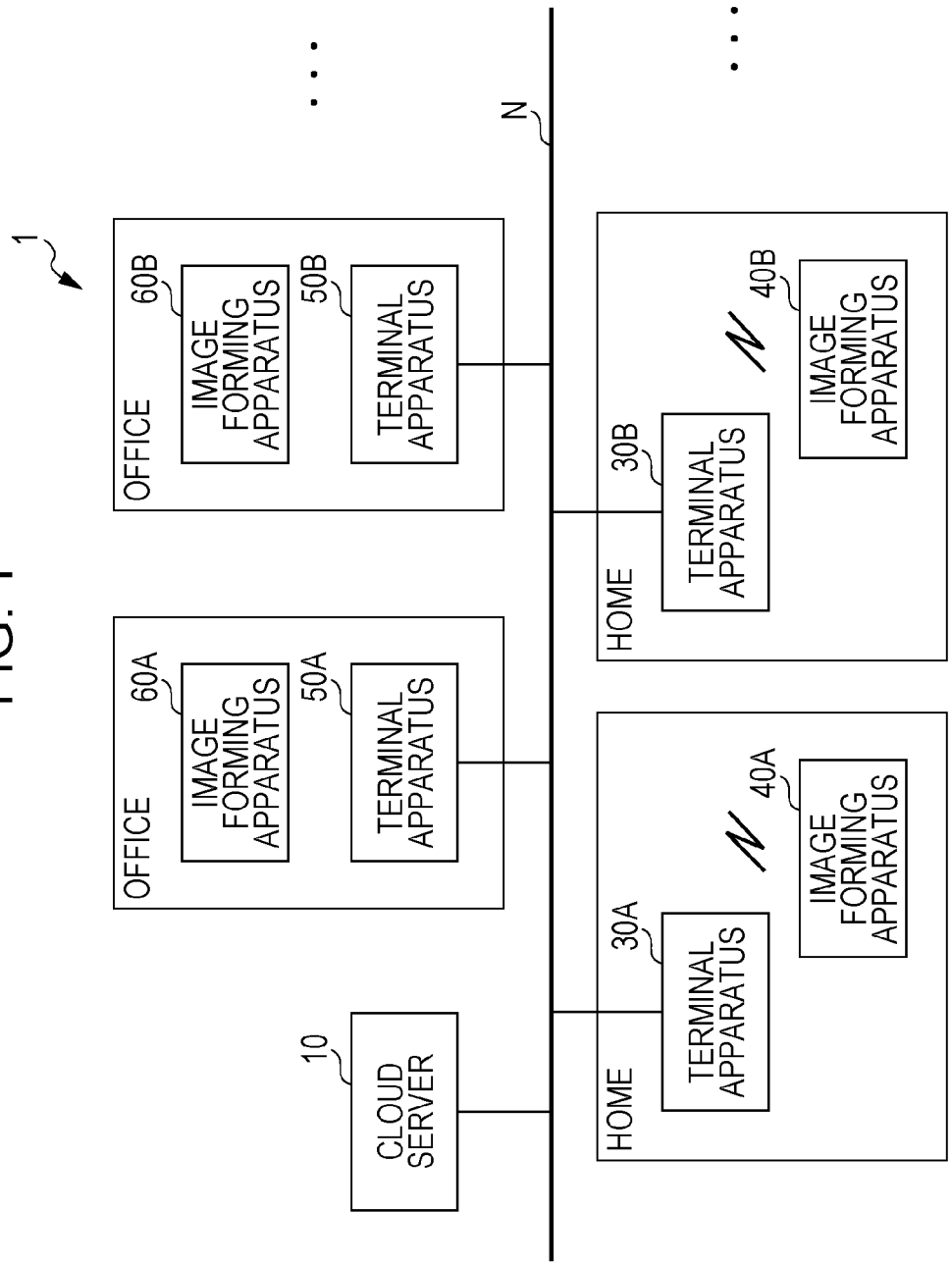
FIG. 1 is a block diagram illustrating a configuration example of an information processing system of an exemplary embodiment of the disclosure.

The information processing system 1 of the exemplary embodiment of the disclosure is described with reference to FIG. 1. FIG. 1 is a block diagram illustrating a configuration example of the information processing system 1.

Referring to FIG. 1, the information processing system 1 includes a cloud server 10, multiple terminal apparatuses 30A, 30B, . . . , multiple terminal apparatuses 50A, 50B, . . . When the terminal apparatuses 30A, 30B, . . . are not differentiated one from another, each apparatus is referred to as a "terminal apparatus 30." When the terminal apparatuses 50A, 50B, . . . are not differentiated one from another, each apparatus is referred to as a "terminal apparatus 50."

The cloud server 10, terminal apparatus 30, and terminal apparatus 50 may be information processing apparatuses, such as personal computers or server computers.

The cloud server 10, terminal apparatus 30, and terminal apparatus 50 are communicably connected to each other via a network N.

According to the exemplary embodiment, the network N includes but is not limited to the Internet, and a combination of communication network, such as a telephone network, and in-house network, such as local-area network (LAN) and wide-area network (WAN). For example, the network N may include a public communication network or an in-house network. According to the exemplary embodiment, the network N may include a wired communication network and wireless communication network. Alternatively, the network N may include either a wired communication network or a wireless communication network.

The terminal apparatus 30 of the exemplary embodiment may be installed at the home of each worker belonging to an office (hereinafter referred to as a "target office") served by the information processing system 1. The terminal apparatus 50 of the exemplary embodiment is installed in each target office and used by the workers. In the information processing system 1 of the exemplary embodiment, the terminal apparatus 30 corresponds to the terminal apparatus 50 on a one-to-one correspondence basis and the terminal apparatus 30 is used to remotely operate the terminal apparatus 50. For this reason, a communication network connecting the terminal apparatus 30 to the terminal apparatus 50 may have a confidentiality level as high as virtual private network (VPN).

For convenience of explanation, FIG. 1 illustrates a single terminal apparatus 50 in each target office. In practice, however, the terminal apparatus 50 is arranged for each worker belonging to the target office.

The image forming apparatuses 40A, 40B, . . . are respectively installed at the homes of workers and the image forming apparatuses 60A, 60B, . . . are respectively installed at target offices. In the following discussion, when the image forming apparatuses 40A, 40B, . . . are not differentiated one from another, each apparatus is referred to as an "image forming apparatus 40" and also when the image forming apparatus 60A, 60B, . . . are not differentiated one from another, each apparatus is referred to as an "image forming apparatus 60."

The image forming apparatus 40 of the exemplary embodiment is capable of wirelessly communicating with each apparatus connected to the network N. The image forming apparatus 60 of the exemplary embodiment is capable of wirelessly communicating with each of the terminal apparatuses 50 in the same office. The communication method of the image forming apparatus 40 and image forming apparatus 60 is not limited to the wireless communication.

According to the exemplary embodiment, each of the image forming apparatus 40 and image forming apparatus 60 is a multi-function apparatus having an image forming function, image reading function, and image transmission function. Alternatively, however, each of the image forming apparatus 40 and image forming apparatus 60 may be an image forming apparatus having only the image forming function or an image forming apparatus having only the image forming function and image reading function.

The image forming apparatus 40 and image forming apparatus 60 are not necessarily identical in specifications and may be different in terms of available service, entry item settable in the available service, or optional component installed on each apparatus.

The cloud server 10 provides the cloud print service described above.

Figure 2:
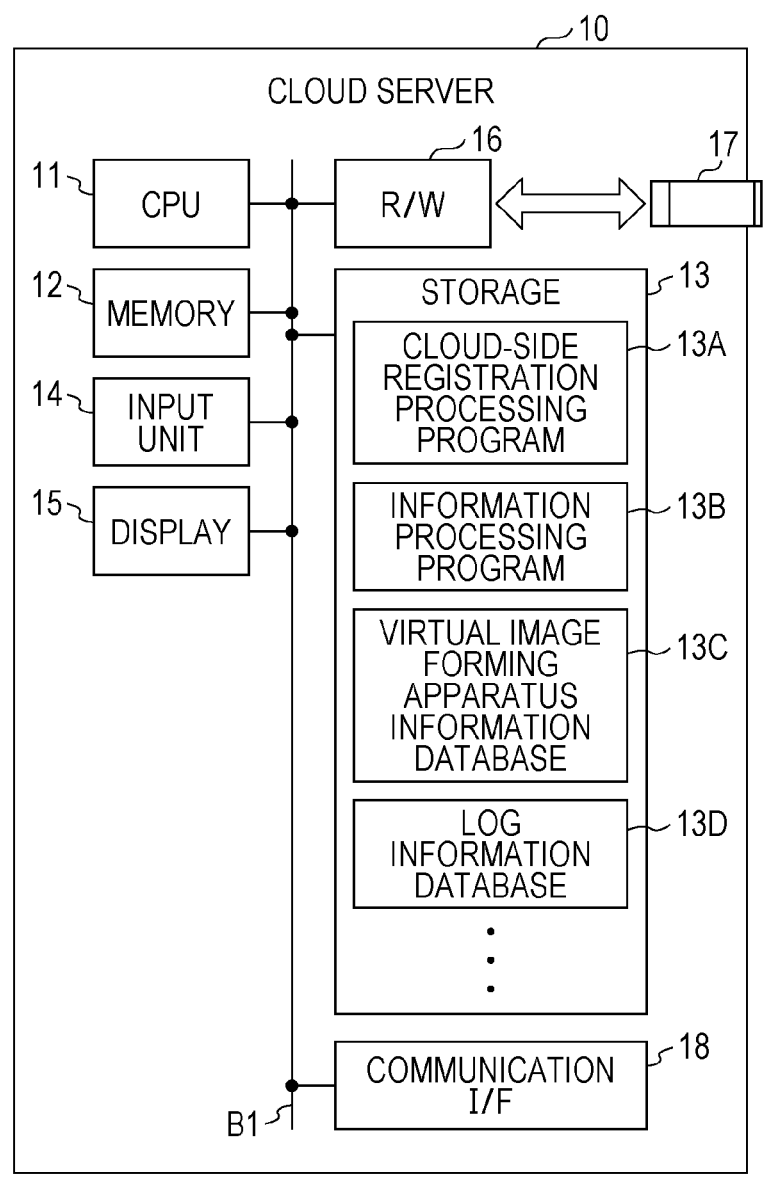
FIG. 2 is a block diagram illustrating a hardware configuration example of a cloud server of the exemplary embodiment of the disclosure.

The configuration of the cloud server 10 of the exemplary embodiment is described with reference to FIG. 2. FIG. 2 is a block diagram illustrating a hardware configuration example of the cloud server 10 of the exemplary embodiment.

Referring to FIG. 2, the cloud server 10 includes a central processing unit (CPU) 11, memory 12 serving as a temporary memory region, non-volatile storage 13, input unit 14 including a keyboard, mouse and the like, display 15, such as a liquid-crystal display, reader/writer (R/W) 16, and communication interface (UF) 18. The CPU 11, memory 12, storage 13, input unit 14, display 15, reader and writer 16, and communication I/F 18 are connected to each other via a bus B1. The reader and writer 16 reads information written on a recording medium 17 and/or writes information on the recording medium 17.

The storage 13 of the exemplary embodiment may include a hard disk drive (HDD), solid-state drive (SSD), flash memory, or the like. The storage 13 serving as the recording medium stores a cloud-side registration processing program 13A and information processing program 13B. The cloud-side registration processing program 13A is stored (installed) on the storage 13 when the recording medium 17 having the cloud-side registration processing program 13A stored thereon is connected to the reader and writer 16 and the reader and writer 16 reads the cloud-side registration processing program 13A. Also, the information processing program 13B is stored (installed) on the storage 13 when the recording medium 17 having the information processing program 13B stored thereon is connected to the reader and writer 16 and the reader and writer 16 reads the information processing program 13B. The CPU 11 reads the cloud-side registration processing program 13A and information processing program 13B as appropriate from the storage 13, stores the cloud-side registration processing program 13A and information processing program 13B onto the memory 12, and then sequentially perform processes of these programs.

The storage 13 also stores a virtual image forming apparatus information database 13C and log information database 13D. The virtual image forming apparatus information database 13C and the log information database 13D are described in greater detail below.

Figure 3:
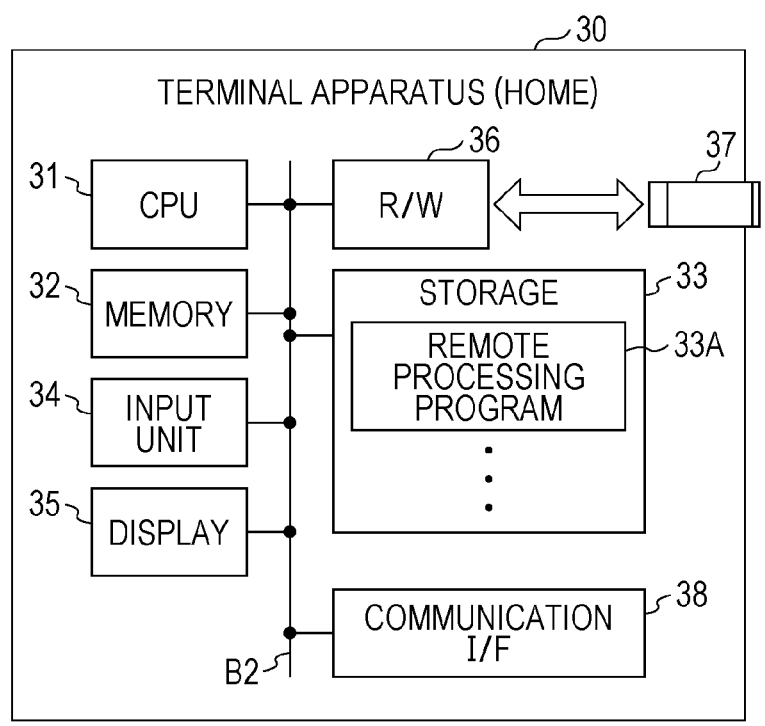
FIG. 3 is a block diagram illustrating a hardware configuration example of a home terminal apparatus of the exemplary embodiment of the disclosure.

The configuration of the terminal apparatus 30 of the exemplary embodiment is descried with reference to FIG. 3. FIG. 3 is a block diagram illustrating a hardware configuration example of the terminal apparatus 30 (the home terminal apparatus 30 for home use).

Referring to FIG. 3, the terminal apparatus 30 of the exemplary embodiment includes a central processing unit (CPU) 31, memory 32 serving as a temporary memory region, non-volatile storage 33, input unit 34 including a keyboard, mouse and the like, display 35, such as a liquid-crystal display, reader/writer (R/W) 36, and communication interface (UF) 38. The CPU 31, memory 32, storage 33, input unit 34, display 35, reader and writer 36, and communication OF 38 are connected to each other via a bus B2. The reader and writer 36 reads information written on a recording medium 37 and/or writes information on the recording medium 37.

The storage 33 of the exemplary embodiment may include an HDD, SSD, flash memory, or the like. The storage 33 serving as the recording medium stores a remote processing program 33A. The remote processing program 33A is stored (installed) on the storage 33 when the recording medium 37 having the remote processing program 33A stored thereon is connected to the reader and writer 36 and the reader and writer 36 reads the remote processing program 33A. The CPU 31 reads the remote processing program 33A as appropriate from the storage 33, stores the remote processing program 33A onto the memory 32, and then sequentially performs the processes of the remote processing program 33A.

Figure 4:
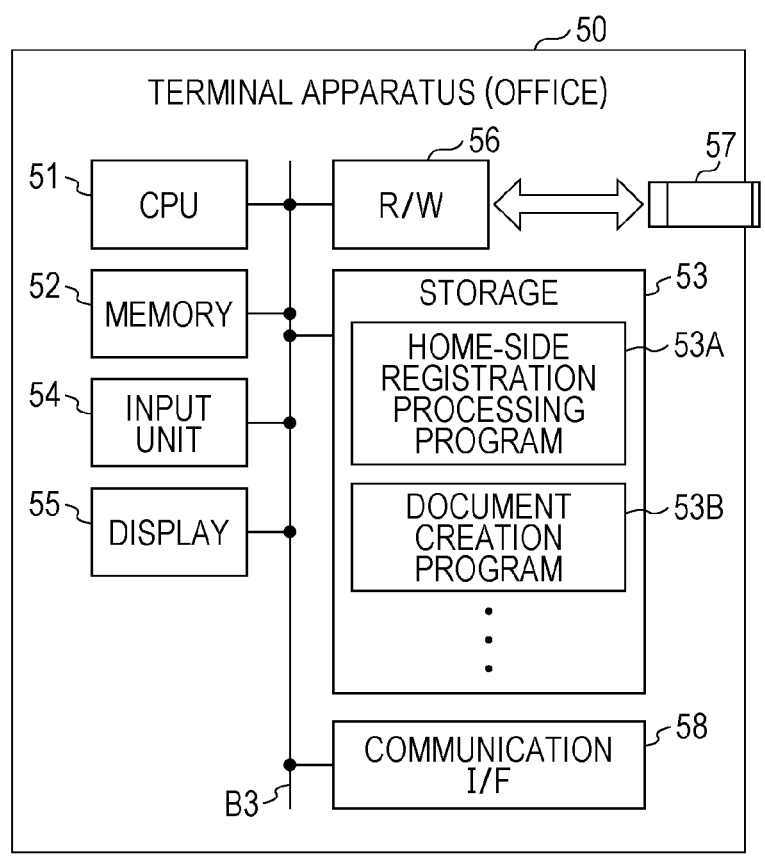
FIG. 4 is a block diagram illustrating a hardware configuration example of an office terminal apparatus of the exemplary embodiment of the disclosure.

The configuration of the terminal apparatus 50 for office use of the exemplary embodiment is described with reference to FIG. 4. FIG. 4 is a block diagram illustrating a hardware configuration example of the office terminal apparatus 50 of the exemplary embodiment.

Referring to FIG. 4, the terminal apparatus 50 of the exemplary embodiment includes a CPU 51, memory 52 serving as a temporary memory region, non-volatile storage 53, input unit 54 including a keyboard, mouse and the like, display 55, such as a liquid-crystal display, reader/writer (R/W) 56, and communication interface OF 58. The CPU 51, memory 52, storage 53, input unit 54, display 55, reader and writer 56, and communication I/F 58 are connected to each other via a bus B3. The reader and writer 56 reads information written on a recording medium 57 and/or writes information on the recording medium 57.

The storage 53 of the exemplary embodiment may include an HDD, SSD, flash memory, or the like. The storage 53 serving as the recording medium stores a home-side registration processing program 53A and document creation program 53B. The home-side registration processing program 53A is stored (installed) on the storage 53 when the recording medium 57 having the home-side registration processing program 53A stored thereon is connected to the reader and writer 56 and the reader and writer 56 reads the cloud-side registration processing program 53A. Also, the document creation program 53B is stored (installed) on the storage 53 when the recording medium 57 having the document creation program 53B stored thereon is connected to the reader and writer 56 and the reader and writer 56 reads the document creation program 53B. The CPU 51 reads the home-side registration processing program 53A and document creation program 53B as appropriate from the storage 53, stores the home-side registration processing program 53A and document creation program 53B onto the memory 52, and sequentially performs processes of these programs.

Figure 5:
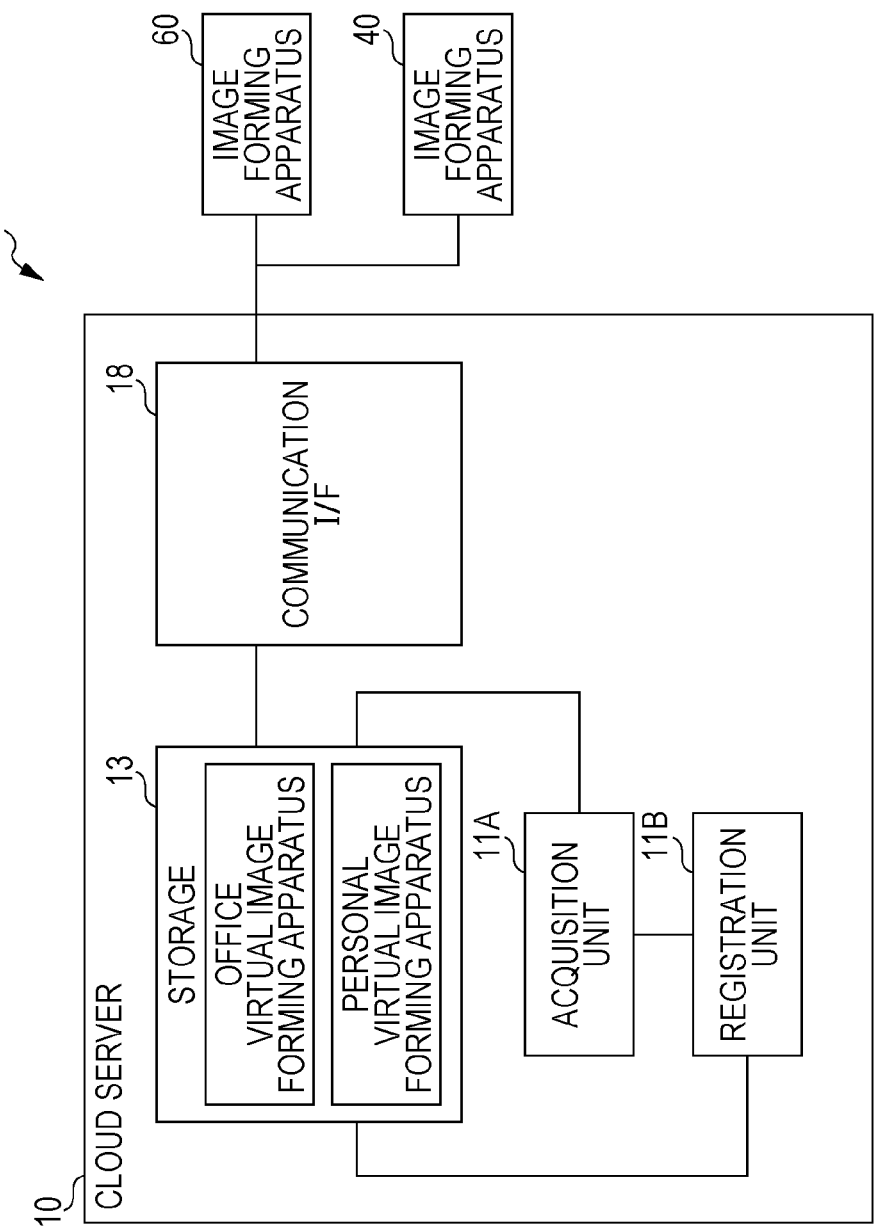
FIG. 5 is a block diagram illustrating a functional configuration example of a cloud server of the exemplary embodiment of the disclosure.

The functional configuration of the cloud server 10 of the exemplary embodiment is described with reference to FIG. 5. FIG. 5 is a block diagram illustrating the functional configuration of the cloud server 10 of the exemplary embodiment.

Referring to FIG. 5, the CPU 11 includes an acquisition unit 11A and registration unit 11B. The CPU 11 in the cloud server 10 operates as the acquisition unit 11A and the registration unit 11B by executing the cloud-side registration processing program 13A and information processing program 13B.

After determining that a predetermined condition applied to increasing information safety is satisfied, the acquisition unit 11A of the exemplary embodiment acquires print information registered on an office virtual image forming apparatus serving as a virtual apparatus of the image forming apparatus 60 installed in a target office.

The registration unit 11B of the exemplary embodiment registers the print information acquired by the acquisition unit 11A on a personal virtual image forming apparatus serving as a virtual apparatus of the personal image forming apparatus 40.

According to the exemplary embodiment, the predetermined condition is that the personal virtual image forming apparatus is approved by an administrator of the image forming apparatus 60 installed in the target office. According to the exemplary embodiment, the approval may be performed in response to results of collation that is performed using identification information able to individually identify the personal image forming apparatus 40. According to the exemplary embodiment, the identification information includes but is not limited to a serial number of the personal image forming apparatus 40. For example, the identification information may be a universally unique identifier (UUID) or a media access control (MAC) address or any combination of the serial number, UUID, and MAC address.

According to the exemplary embodiment, the predetermined condition may be that log information related to a log of registration of the print information onto the personal virtual image forming apparatus is recorded. According to the exemplary embodiment, the log information includes but is not limited to sender information indicating the office virtual image forming apparatus serving as a sender of the print information, destination information indicating the personal virtual image forming apparatus serving as a destination of the print information, and date and time information indicating a date and time on which the print information is registered. The log information may include any combination selected from the group consisting of these three pieces of information.

The virtual image forming apparatus information database 13C of the exemplary embodiment is described with reference to FIG. 6. FIG. 6 illustrates a structure example of the virtual image forming apparatus information database 13C of the exemplary embodiment.

The virtual image forming apparatus information database 13C of the exemplary embodiment stores, in an associated form, an office virtual image forming apparatus and an personal virtual image forming apparatus corresponding to the office virtual image forming apparatus. As illustrated in FIG. 6, the virtual image forming apparatus information database 13C stores, in an associated form, an office identification (ID), office virtual image forming apparatus, identification information, and personal virtual image forming apparatus.

Office IDs are respectively attached to target offices for identification. The office virtual image forming apparatus is information indicating the office virtual image forming apparatus itself. The identification information has been described. The personal virtual image forming apparatus is information indicating the personal virtual image forming apparatus itself. Like a real hardware device, each virtual image forming apparatus is attached with metadata, such as setting data indicating a variety of setting states, and machine information related to a corresponding image forming apparatus. For convenience of explanation, the metadata is not described herein.

As described above, the information processing system 1 of the exemplary embodiment uses as the predetermined condition a condition that the personal virtual image forming apparatus is approved by the administrator of the image forming apparatus 60 installed in the target office. According to the exemplary embodiment, the approval is performed in response to the results of collation performed using the identification information (serial number in the exemplary embodiment) that identifies the personal image forming apparatus 40.

The information processing system 1 of the exemplary embodiment is based on the assumption that the approval of the personal virtual image forming apparatus is granted when a user (worker in the exemplary embodiment) has applied for the registration of the personal virtual image forming apparatus. To this end, in the information processing system 1 of the exemplary embodiment, the identification information on the personal image forming apparatus 40 approved by the administrator is registered in advance in association with the corresponding office virtual image forming apparatus on the virtual image forming apparatus information database 13C. In accordance with the collation results of the identification information, the personal virtual image forming apparatus is approved when the registration of the personal virtual image forming apparatus corresponding to the personal image forming apparatus 40 is applied.

Referring to FIG. 6, for convenience of explanation, one office virtual image forming apparatus is registered for one target office. Alternatively, multiple office virtual image forming apparatuses for one target office may be registered in the virtual image forming apparatus information database 13C.

Referring to FIG. 7, the log information database 13D of the exemplary embodiment is described below. FIG. 7 illustrates an example of the structure of the log information database 13D of the exemplary embodiment.

The log information database 13D stores information indicating a log related to the acquisition of the print information performed by the acquisition unit 11A and the registration of the print information performed by the registration unit 11B. For example, as illustrated in FIG. 7, the log information database 13D of the exemplary embodiment stores in an associated form a variety of information including the office ID, sender, destination, date and time, and print information.

The office ID is identical to the office ID of the virtual image forming apparatus information database 13C. The sender is information (the serial number of the corresponding image forming apparatus 60 in the exemplary embodiment) indicating the virtual image forming apparatus serving as the sender of the print information and the destination is information (the serial number of the corresponding image forming apparatus 40 in the exemplary embodiment) indicating the personal virtual image forming apparatus serving as the destination of the print information. The date and time is information on the date and time on which the personal virtual image forming apparatus serving as the sender has acquired and registered the print information onto the personal virtual image forming apparatus serving as the destination. The print information is information that is related to printing.

Figure 8:
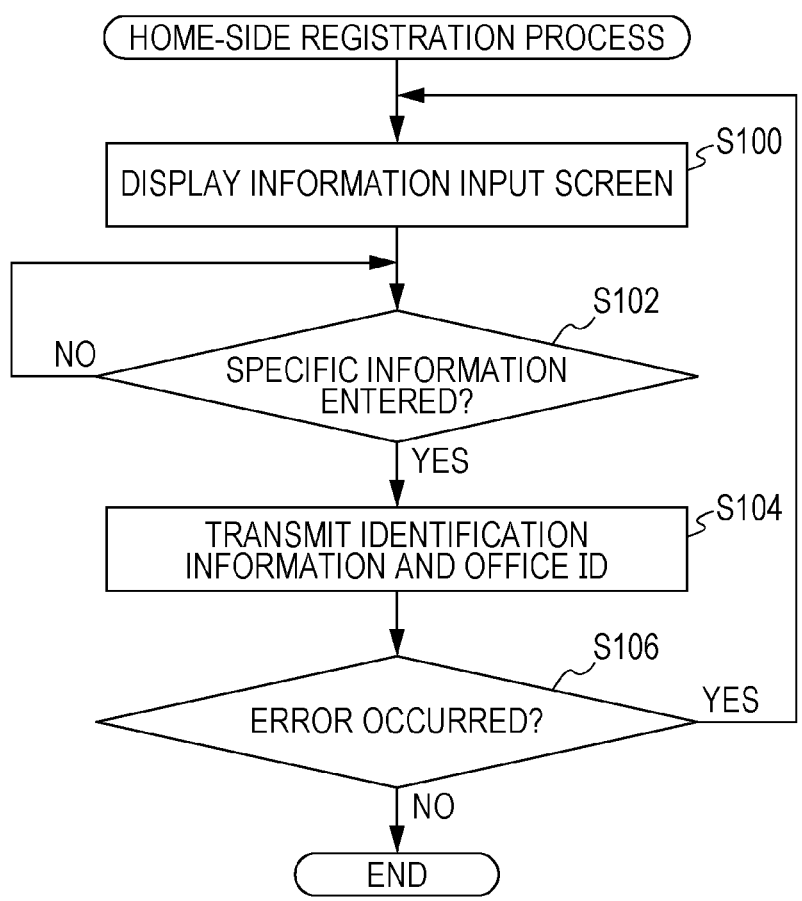
FIG. 8 is a flowchart illustrating an example of a home-side registration process of the exemplary embodiment of the disclosure.

The operation of the information processing system 1 of the exemplary embodiment is described with reference to FIGS. 8 through 14. Referring to FIGS. 8 through 9, the operation of the office terminal apparatus 50 in the home-side registration process is described below. FIG. 8 is a flowchart illustrating the home-side registration process of the exemplary embodiment.

In the information processing system 1 of the exemplary embodiment, the user (worker) of the information processing system 1 operates the terminal apparatus 30 to execute the remote processing program 33A to apply for the registration of the personal virtual image forming apparatus corresponding to the personal image forming apparatus 40 owned by the user. The user thus applies for the registration by remotely operating the corresponding office terminal apparatus 50. When the registration of the personal virtual image forming apparatus is applied, the user may enter an execution instruction on the input unit 34 of the terminal apparatus 30. The CPU 51 of the office terminal apparatus 50 executes the home-side registration processing program 53A, thereby performing the home-side registration process illustrated in FIG. 8. For convenience of explanation, information other than the personal virtual image forming apparatus is registered in the virtual image forming apparatus information database 13C.

In step S100 in FIG. 8, the CPU 51 controls the display 55 to display a registration information input screen in a predetermined form. In step S102, the CPU 51 waits on standby until predetermined information is entered. Since the office terminal apparatus 50 is remotely operated by the terminal apparatus 30, the registration information input screen displayed on the display 55 is displayed on the display 35 in the terminal apparatus 30. FIG. 9 illustrates an example of the registration information input screen of the exemplary embodiment.

Referring to FIG. 9, the registration information input screen of the exemplary embodiment displays the identification information (the serial number in the exemplary embodiment) on the image forming apparatus 40 used by the user and a message prompting the user to enter the office ID of the office of the user. The registration information input screen displays an input region 35A is ready to receive the identification information and an input region 35B is ready to receive the office ID.

When the registration information input screen illustrated in FIG. 9 is displayed, the user uses the input unit 34 to enter, in the input region 35A, the serial number of the image forming apparatus 40 used by the user and enter the office ID of the office of the user in the input region 35B. After entering these pieces of information, the user selects a run button 35D using the input unit 34. With the run button 35D selected by the user, the yes path in step S102 is followed and the process proceeds to step S104.

In step S104, the CPU 51 transmits to the cloud server 10 the serial number and office ID entered by the user.

The cloud server 10 receives the serial number and office ID and performs a cloud-side registration process (see also FIG. 10) described below. Using the received information, the cloud server 10 performs data collation. If an error occurs, the cloud server 10 transmits, to the office terminal apparatus 50 as the sender of the information, error information indicating the occurrence of the error.

In step S106, the CPU 51 determines the occurrence of the error by determining whether the error information has been received. If the yes path is followed, the CPU 51 returns to step S100 and if the no path is followed, the CPU 51 ends the home-side registration process.

Figure 10:
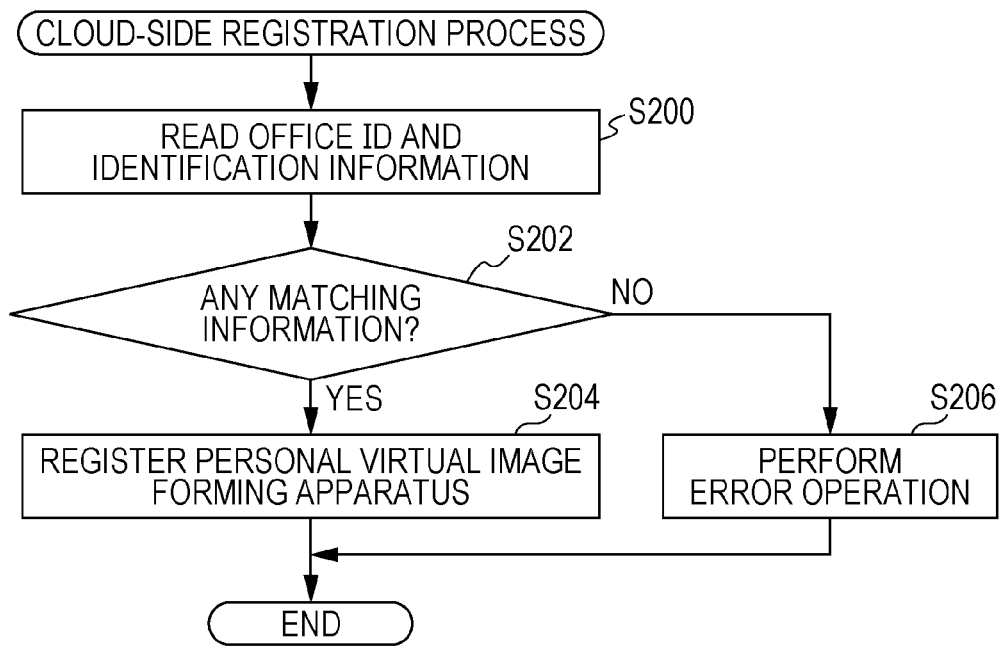
FIG. 10 is a flowchart illustrating an example of a cloud-side registration process of the exemplary embodiment of the disclosure.

Referring to FIG. 10, the operation of the cloud server 10 in a cloud-side registration process is described below. FIG. 10 is a flowchart illustrating an example of the cloud-side registration process of the exemplary embodiment.

When the serial number and office ID are received from the office terminal apparatus 50, the CPU 11 in the cloud server 10 executes the cloud-side registration processing program 13A, thereby preforming the cloud-side registration process in FIG. 10.

In step S200 in FIG. 10, the CPU 11 reads all the office IDs and identification information from the virtual image forming apparatus information database 13C.

In step S202, the CPU 11 identifies an office ID matching the received office ID out of the read office IDs. The CPU 11 determines whether the identification information corresponding to the identified office ID includes the identification information matching the received serial number. If the yes path is followed, the CPU 11 determines that the received information is to be approved and the CPU 11 then proceeds to step S204.

In step S204, the CPU 11 creates a personal virtual image forming apparatus corresponding to the image forming apparatus 40 having the received serial number and stores (registers) the personal virtual image forming apparatus in a corresponding memory region of the virtual image forming apparatus information database 13C. The CPU 11 then ends the cloud-side registration process.

If the no path is followed in step S202, the CPU 11 determines that the received information is not to be approved and then the CPU 11 proceeds to step S206.

In step S206, the CPU 11 performs a predetermined error operation and then ends the cloud-side registration process. In the error operation of the exemplary embodiment, error information is transmitted to the office terminal apparatus 50 serving as the sender of the above-described information. Alternatively, in the error operation, the office terminal apparatus 50 serving as the sender of the information may be caused to display information indicating that authentication has been unsuccessful.

Through the home-side registration process and cloud-side registration process, only the personal image forming apparatus 40 approved in advance by the administrator is registered in the virtual image forming apparatus information database 13C.

Figure 11:
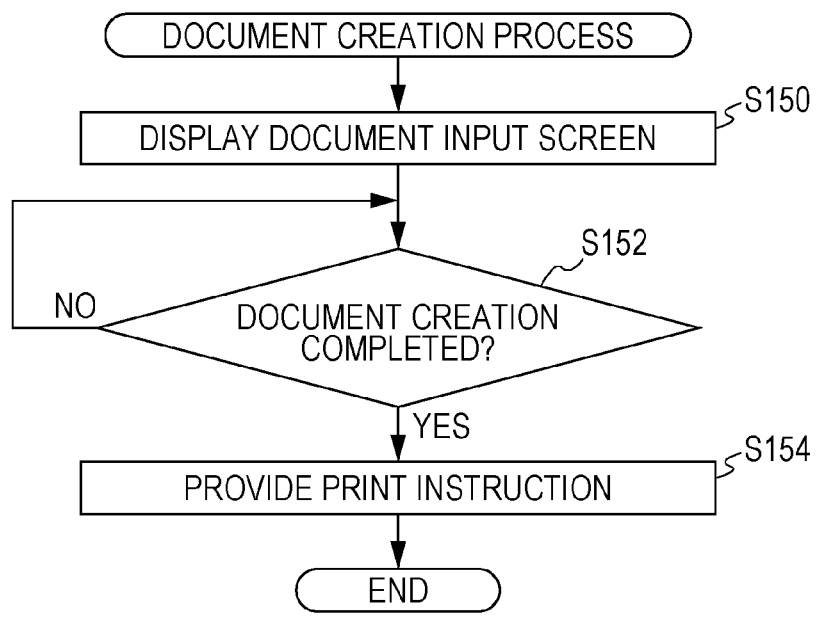
FIG. 11 is a flowchart illustrating an example of a document creation process of the exemplary embodiment of the disclosure.

The operation of the office terminal apparatus 50 of the exemplary embodiment in a document creation process is described below with reference to FIG. 11. FIG. 11 is a flowchart illustrating an example of the document creation process of the exemplary embodiment.

The user may now enter an execution instruction on the input unit 34 in the terminal apparatus 30 to remotely create a document on the terminal apparatus 50. The document creation process in FIG. 11 is performed when the CPU 51 in the terminal apparatus 50 executes the document creation program 53B.

In step S150 in FIG. 11, the CPU 51 controls the display 55 to display a document input screen (not illustrated) having a predetermined form. When the document input screen is displayed on the display 35, the user may create a document on the document input screen. In step S152, the CPU 51 waits on standby until the document creation is complete.

In step S154, the CPU 51 creates the print information according to which the document created by the user is printed. In response to an instruction from the user, the CPU 51 instruct the image forming apparatus 60 to perform a print operation responsive to the print information. The CPU 51 thus transmits the print information to the image forming apparatus 60 and then ends the document creation process.

When the image forming apparatus 60 establishes synchronization with the corresponding office virtual image forming apparatus at a predetermined timing (every 5 seconds in the exemplary embodiment), the received print information is registered in the office virtual image forming apparatus.

Figure 12:
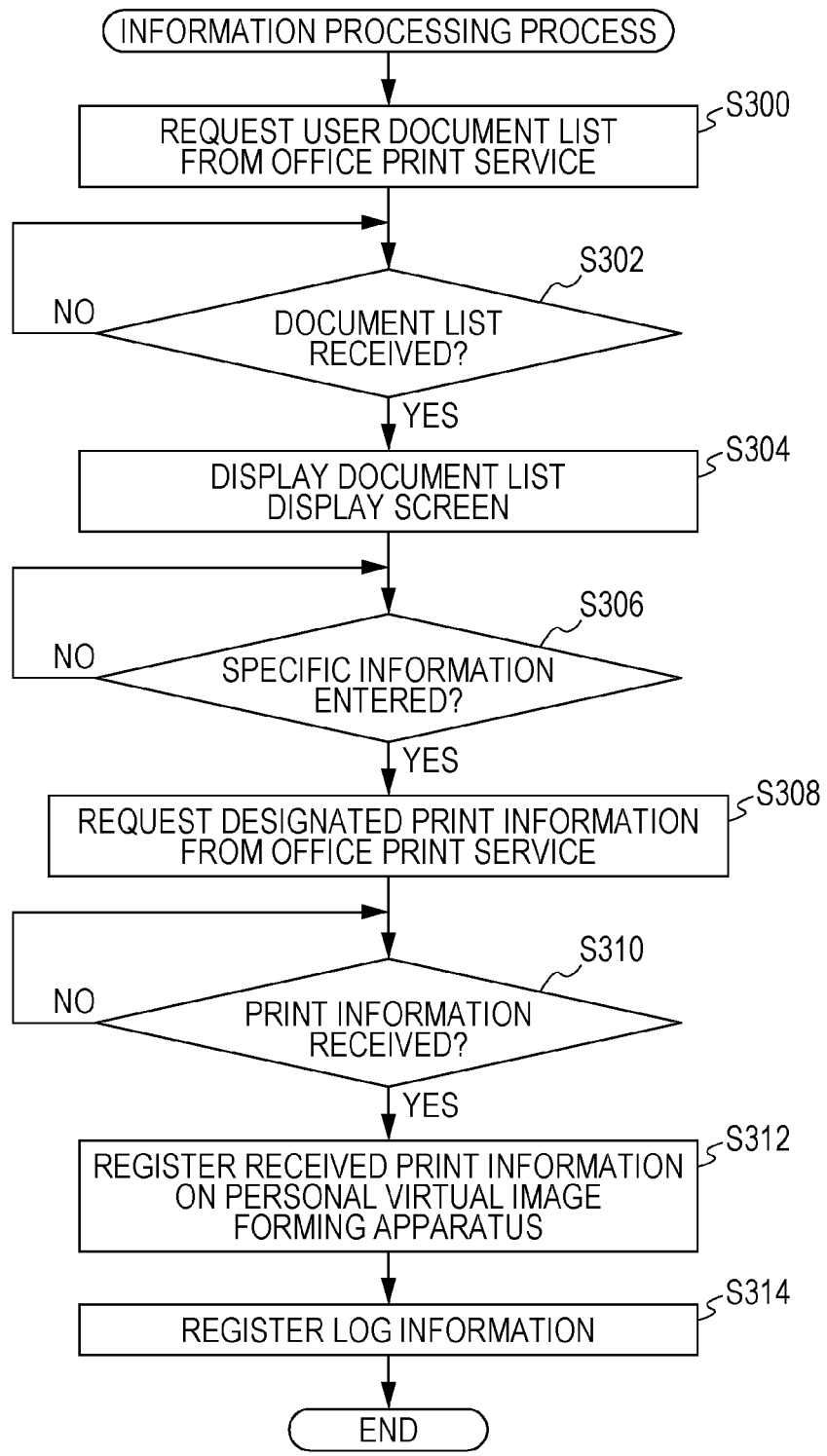
FIG. 12 is a flowchart illustrating an example of an information processing process of the exemplary embodiment of the disclosure.

The operation of the cloud server 10 of the exemplary embodiment in an information processing process is described with reference to FIGS. 12 through 13. FIG. 12 is a flowchart illustrating an example of the information processing process.

The user (worker) may enter an execution instruction via the input unit 34 in the terminal apparatus 30 in order to cause the image forming apparatus 40 to perform the print operation responsive to the registered print information. The CPU 11 in the cloud server 10 executes the information processing program 13B, thereby performing the information processing process in FIG. 12.

A print service managing the office virtual image forming apparatus (hereinafter referred to as an "office print service") and a print service managing the personal virtual image forming apparatus (hereinafter referred to as a "personal print service") are available in the information processing system 1 of the exemplary embodiment. The information processing process of the exemplary embodiment is performed by the personal print service.

In step S300 in FIG. 12, the CPU 11 requests from the office print service a document list of documents corresponding to the print information registered by a target user. In response to the request, the office print service inquires of the corresponding office virtual image forming apparatus the document corresponding to the print information registered by the target user. The office print service receives documents from the office virtual image forming apparatus in response to the inquiry and transmits a list of the acquired documents as a document list to the personal print service.

In step S302, the CPU 11 waits on standby until the document list is received from the office print service.

In step S304, the CPU 11 controls the display 35 in the terminal apparatus 30 as an access source (hereinafter referred to as a "target terminal apparatus") in accordance with the received document list such that a document list display screen in a predetermined form is displayed. In step S306, the CPU 11 waits on standby until the target terminal apparatus has received predetermined information. FIG. 13 illustrates an example of the document list display screen of the exemplary embodiment.

Figure 13:
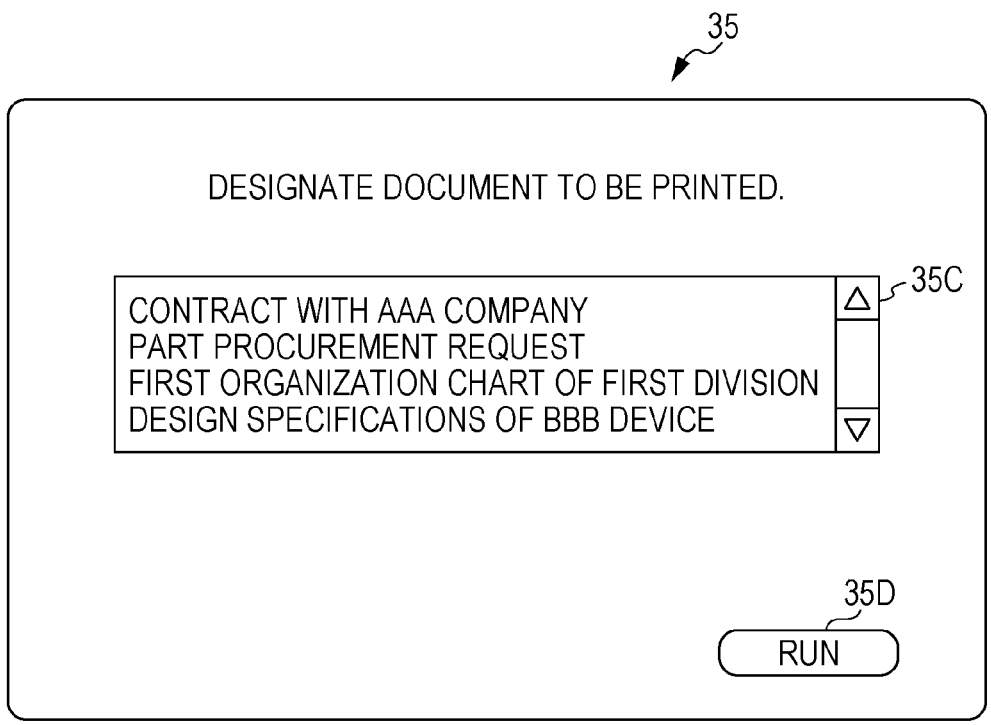
FIG. 13 is a front view example of a document list display screen of the exemplary embodiment of the disclosure.

Referring to FIG. 13, the document list display screen of the exemplary embodiment displays, in a list in a document designate region 35C, a message prompting the target user to designate a document for printing and the name of the document corresponding to the print information registered in advance by the target user. The target user thus designates the name of the document for printing using the input unit 34 in the target terminal apparatus and then selects the run button 35D. When the target user selects the run button 35D, the yes path is followed in step S306 and the process proceeds to step S308.

In step S308, the CPU 11 requests from the office print service the print information on the document designated by the target user. In response to the request, the office print service requests the print information from the corresponding office virtual image forming apparatus. The office print service transmits to the personal print service the print information acquired from the office virtual image forming apparatus in response to the request.

In step S310, the CPU 11 waits on standby until the print information is received from the office print service.

In step S312, the CPU 11 registers the received print information on the personal virtual image forming apparatus registered by the target user. In step S314, the CPU 11 stores (registers), in the log information database 13D, information related to transactions exchanged between the office print service and the personal print service in the process described above. The CPU 11 then ends the information processing process.

The print operation responsive to the print information registered on the personal virtual image forming apparatus in the information processing process is thus performed when the synchronization with the image forming apparatus 40 used by the target user is established at the predetermined timing (every 5 seconds in the exemplary embodiment).

Figure 14:
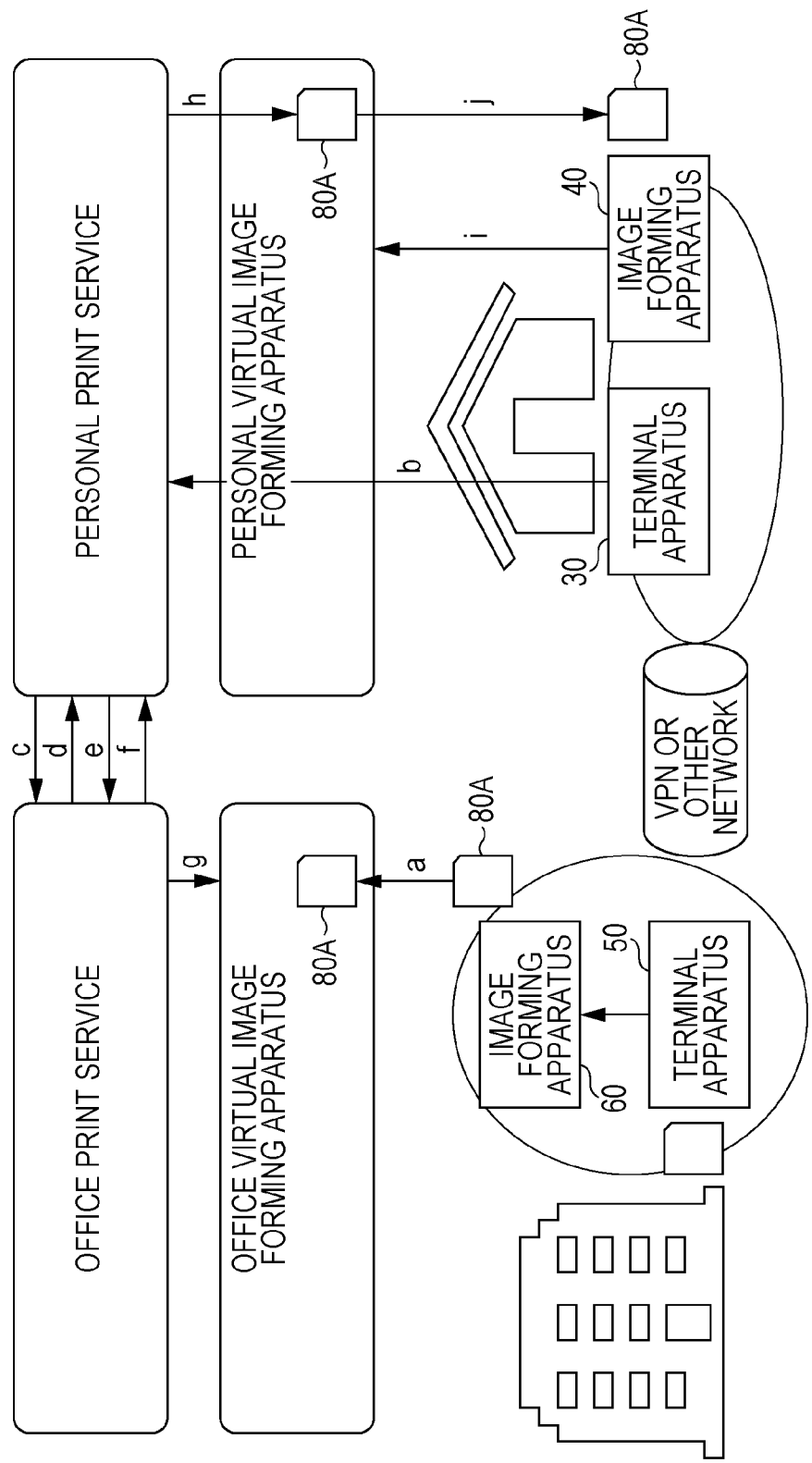
FIG. 14 illustrates an example of a flow of information when the document creation process and information processing process of the exemplary embodiment of the disclosure are performed.

FIG. 14 schematically illustrates an example of the flow of a variety of information when the document creation process and information processing process are performed.

Referring to FIG. 14, the document creation process registers, in the office virtual image forming apparatus, print information 80A of a document that the user has remotely created using the office terminal apparatus 50 (as denoted by an arrow a).

In response to an instruction from the terminal apparatus (as denoted by an arrow b) 30, the information processing process registers, in the personal virtual image forming apparatus, the print information 80A (as denoted by an arrow h), acquired as results of transactions performed between the personal print service and the office print service (as denoted by arrows c through g). When the image forming apparatus 40 is synchronized with the personal virtual image forming apparatus (as denoted by an arrow i), the print information 80A is transmitted to the image forming apparatus 40 (as denoted by an arrow j) for printing.

According to the exemplary embodiment, the technique of the disclosure is applied to the cloud print service. The disclosure is not limited to this method The technique of the disclosure may also be applied to a print service that does not employ the cloud server but employs an in-house network server.

According to the exemplary embodiment, the office virtual image forming apparatus and the personal virtual image forming apparatus are arranged in a single cloud server 10. The disclosure is not limited to this method. The office virtual image forming apparatus and the personal virtual image forming apparatus may also be arranged in different servers.

According to the exemplary embodiment, the personal virtual image forming apparatus is approved by the administrator of the image forming apparatus 60. Alternatively, the personal virtual image forming apparatus may be approved by a manufacturer of the image forming apparatus 60.

The exemplary embodiment is not intended to limit the scope of the disclosure defined by the claims. All combinations of the features described with reference to the exemplary embodiment are not necessarily required. The exemplary embodiment includes techniques in a variety of phases of the exemplary embodiment described above. A variety of disclosures may result from combining a variety of elements disclosed herein. Even if a subset of the disclosed elements is removed, a configuration with the subset removed may still form a disclosure as long as the disclosure has an effect.

According to the exemplary embodiment, the information processing process is implemented by a program, namely, a computer-based software configuration. The disclosure is not limited to this method. The information processing process may also be implemented by a hardware configuration or a combination of the software configuration and hardware configuration.

The configurations of the cloud server 10, terminal apparatus 30, and office terminal apparatus 50 have been described for exemplary purposes only. An element may be removed or added without departing from the scope of the disclosure.

The information processing process of the exemplary embodiment has been described for exemplary purposes only. A step may be deleted or added in the information processing process without departing from the scope of the disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus including:
  a processor configured to:
    after determining that a predetermined condition applied to increasing information security is satisfied, acquire print information that is registered on an office virtual image forming apparatus that is a virtual apparatus of an image forming apparatus installed in an office; and register the acquired print information on a personal virtual image forming apparatus that is a virtual apparatus of a personal image forming apparatus.

(((2)))

In the information processing apparatus according to (((1))), the predetermined condition is that the personal virtual image forming apparatus is a virtual apparatus approved by an administrator of the image forming apparatus installed in the office.

(((3)))

In the information processing apparatus according to (((2))), an approval of the virtual apparatus is granted in response to results of collation that is performed using identification information able to individually identify the personal image forming apparatus.

(((4)))

In the information processing apparatus according to (((3))), the identification information includes at least one of a serial number of the personal image forming apparatus or a media access control address of the personal image forming apparatus.

(((5)))

In the information processing apparatus according to any one of (((1))) through (((4))), the predetermined condition is that log information indicating a log of registering the print information on the personal virtual image forming apparatus is recorded.

(((6)))

In the information processing apparatus according to (((5))), the log information includes at least one piece of information of sender information indicating the office virtual image forming apparatus serving as a sender of the print information, destination information indicating the personal virtual image forming apparatus serving as a destination of the print information, or date and time information indicating date and time of registration of the print information.

What is claimed is:

1. An information processing apparatus comprising:
   a processor configured to:
      after determining that a predetermined condition applied to increasing information security is satisfied, acquire print information that is registered on an office virtual image forming apparatus that is a virtual apparatus of an image forming apparatus installed in an office; and
      register the acquired print information on a personal virtual image forming apparatus that is a virtual apparatus of a personal image forming apparatus.

2. The information processing apparatus according to claim 1, wherein the predetermined condition is that the personal virtual image forming apparatus is a virtual apparatus approved by an administrator of the image forming apparatus installed in the office.

3. The information processing apparatus according to claim 2, wherein an approval of the virtual apparatus is granted in response to results of collation that is performed using identification information able to individually identify the personal image forming apparatus.

4. The information processing apparatus according to claim 3, wherein the identification information comprises at least one of a serial number of the personal image forming apparatus or a media access control address of the personal image forming apparatus.

5. The information processing apparatus according to claim 1, wherein the predetermined condition is that log information indicating a log of registering the print information on the personal virtual image forming apparatus is recorded.

6. The information processing apparatus according to claim 5, wherein the log information includes at least one piece of information of sender information indicating the office virtual image forming apparatus serving as a sender of the print information, destination information indicating the personal virtual image forming apparatus serving as a destination of the print information, or date and time information indicating date and time of registration of the print information.

7. A non-transitory computer readable medium storing a program causing a computer to execute a process for processing information, the process comprising:
   after determining that a predetermined condition applied to increasing information security is satisfied, acquiring print information that is registered on an office virtual image forming apparatus that is a virtual apparatus of an image forming apparatus installed in an office; and
   registering the acquired print information on a personal virtual image forming apparatus that is a virtual apparatus of a personal image forming apparatus.

8. An information processing method comprising:
   after determining that a predetermined condition applied to increasing information security is satisfied, acquiring print information that is registered on an office virtual image forming apparatus that is a virtual apparatus of an image forming apparatus installed in an office; and
   registering the acquired print information on a personal virtual image forming apparatus that is a virtual apparatus of a personal image forming apparatus.

* * * * *